United States Patent [19]

Fuchs et al.

[11] 4,318,765
[45] Mar. 9, 1982

[54] LAMINATE APPLYING MACHINE AND METHOD

[75] Inventors: Gilbert Fuchs; Norman Crowley; Randall Wink, all of Evansville, Ind.

[73] Assignee: Evana Tool & Engineering Co., Evansville, Ind.

[21] Appl. No.: 182,083

[22] Filed: Aug. 28, 1980

Related U.S. Application Data

[63] Continuation-in-part of Ser. No. 181,698, Aug. 27, 1980.

[51] Int. Cl.³ ............................................. B32B 31/00
[52] U.S. Cl. ...................................... 156/256; 156/269; 156/297; 156/521; 156/556; 156/538; 198/774
[58] Field of Search ............... 156/256, 269, 285, 297, 156/510, 521, 556, 405 R, DIG. 11, DIG. 40, 538, 539; 198/774

[56] References Cited

U.S. PATENT DOCUMENTS

| | | | |
|---|---|---|---|
| 1,466,029 | 8/1923 | Peters | 198/774 |
| 2,026,172 | 12/1935 | Holm | 198/774 |
| 3,508,993 | 4/1970 | Belcher et al. | 156/285 X |
| 4,003,780 | 1/1977 | Cohn | 156/519 |
| 4,191,605 | 3/1980 | Katterheinrich et al. | 156/297 |
| 4,233,331 | 11/1980 | Lemke et al. | 156/521 X |

Primary Examiner—John E. Kittle
Attorney, Agent, or Firm—Larson and Taylor

[57] ABSTRACT

An improved apparatus and method for applying an adhesive laminate to a plate are disclosed. In a preferred embodiment, the invention comprises a cylindrical drum having a circular periphery of a porous material and a vacuum applied to the interior thereof and an assembly for supplying an adhesive laminate, adhesive side outward, to the periphery of the drum where it is securely retained in place by the vacuum. A walking beam conveyor comprised of two, spaced apart beams conveys the plates between positions on a centrally located, stationary rail. The walking beam conveyor also positions the forward end of the plate into contact with an end of the laminate segment. The walking beam conveyor then deposits the plate and attached laminate onto the central rail. A roller assembly, mounted on the walking beam conveyor, rolls the laminate onto the plate as the walking beam conveyor moves backwardly to the starting position.

26 Claims, 15 Drawing Figures

FIG. 10F

LAMINATE APPLYING MACHINE AND METHOD

CROSS REFERENCE TO RELATED APPLICATION

This application is a continuation-in-part of a patent application entitled Laminate Applying Machine and Method Ser. No. 181,698, filed Aug. 27, 1980, incorporated in its entirety herein by reference.

FIELD OF THE INVENTION

The present invention generally relates to a method and machine for applying a lamina to a substrate, and more particularly relates to a method and machine for applying an adhesive laminate to a plate without creating any wrinkles or leaving any air pockets in the finished product.

BACKGROUND OF THE INVENTION

As stated in the parent application, there is need in the medical field for equipment which will rapidly produce clear plastic plates containing a plurality of pockets and passageways for carrying out various chemical reactions. The plates with pockets and passageways may be molded of clear plastic with little difficulty, as shown in FIG. 2 of the parent application.

However, it is essential that a clear plastic cover be laid down over the faces of each plate to completely enclose the pockets in the plate. Because the chemical reactions are read by a computer, the clear plastic must be very precisely laid down in a wrinkle-free condition so that the plate can be accurately read. Heretofore, a clear plastic tape having adhesive on one face thereof has been used to provide covers for each side of the plastic plate.

A prior art method and machine is described in the parent application and schematically depicted in FIG. 1 thereof. This machine utilized a hexagonal wheel having an adhesive laminate strip on some of the sides thereof. The laminate was applied to the plate in a stamping motion. The adhesive laminate was fed to the hexagonal wheel at a first location, was cut into strips at a second location after the wheel had indexed, and was applied to the plate at a third location by moving the plate upwardly to contact the wheel located thereabove. The plate was then turned over and the process repeated for the other side. With this particular machine operating at its best speed, approximately twenty-five plate sides can be done per minute.

The disadvantages of the aforedescribed machine were described in the parent application. While this machine produced generally acceptable results to plates that were evaluated or read manually, it did not produce a sufficiently satisfactory product that could be read by a computer. The air bubbles and wrinkles, often times minute, often produced incorrect readings when taken by the computer.

SUMMARY OF THE INVENTION

In the parent application, a new approach for applying the laminate to the plate was disclosed. In that new approach, the laminate was conveyed on a cylindrical drum to an application position, under which was located a vertically movable platform. A walking beam conveyor conveyed the plates to the platform which, in turn, was vertically moved to contact one end of the laminate with one end of the plate. The platform was then positioned to an intermediate position and a roller assembly rolled the laminate onto the plate. Obviously, the walking beam assembly could not be in operation while the platform and the roller assembly were in operation. Furthermore, additional mechanical elements were required for the platform assembly, the platform moving means, and the roller moving means.

The present improved invention overcomes the disadvantages and difficulties of the prior art devices and methods and also provides a more efficient and faster machine than the machine disclosed in the parent application. More particularly, the present improved invention can more rapidly apply the laminate to the plate with a far greater accuracy and produce far fewer rejects than the prior art devices and with the same accuracy and efficiency as the parent machine. Like the parent machine, the present improved machine is all mechanical utilizing a relatively simple motor and belt power transmission system for moving all of the components in a timed sequence. The present invention still wipes the adhesive laminate onto the plate, thereby pushing air out ahead of the contact line, as in the parent machine. Also, only one end of the plate is brought into contact with one end of the tape, with the tape being fully applied to the plate through a roller assembly.

Thus, a device in accordance with the present invention is faster, more reliable, less expensive to manufacture and operate, more efficient and accurate, and simpler in construction and operation than both the prior art devices and the parent machine.

An apparatus in accordance with the present invention comprises a means for conveying a laminate strip to an application position, means for positioning one end of a plate into abutting contact with an end of a conveyed laminate strip whereby the two ends adhere to each other, and a means for rolling the laminate strip onto the plate. In a presently preferred embodiment of the apparatus, a walking beam conveyor assembly conveys a plurality of plates to the application position whereupon further movement of the walking beam conveyor assembly, one end of the plate is brought into contact with one end of the laminate strip. The roller assembly is attached to the walking beam conveyor assembly so that upon the return stroke of the walking beam, the roller of the roller assembly is brought into engagement with the end of the laminate strip affixed to the plate and upon further movement of the walking beam, the roller rolls the laminate strip onto the plate.

A method in accordance with the present invention includes conveying a plate to a application position with a walking beam assembly that includes a movable walking beam and a stationary rail, and conveying an end of a laminate to the application position. One end of the laminate is then contacted by and adheres to one end of the plate, following which the walking beam is moved to cause relative contact between the adhering plate and laminate ends and a contact member. The walking beam is moved further to cause relative longitudinal movement between the adhering ends and the contact member so as to apply successively the laminate to the plate.

The features and the advantages of the present invention will be discussed in or apparent from the description of the preferred embodiments of the invention found here and below.

3

DESCRIPTION OF THE PREFERRED EMBODIMENT

Figure 1:
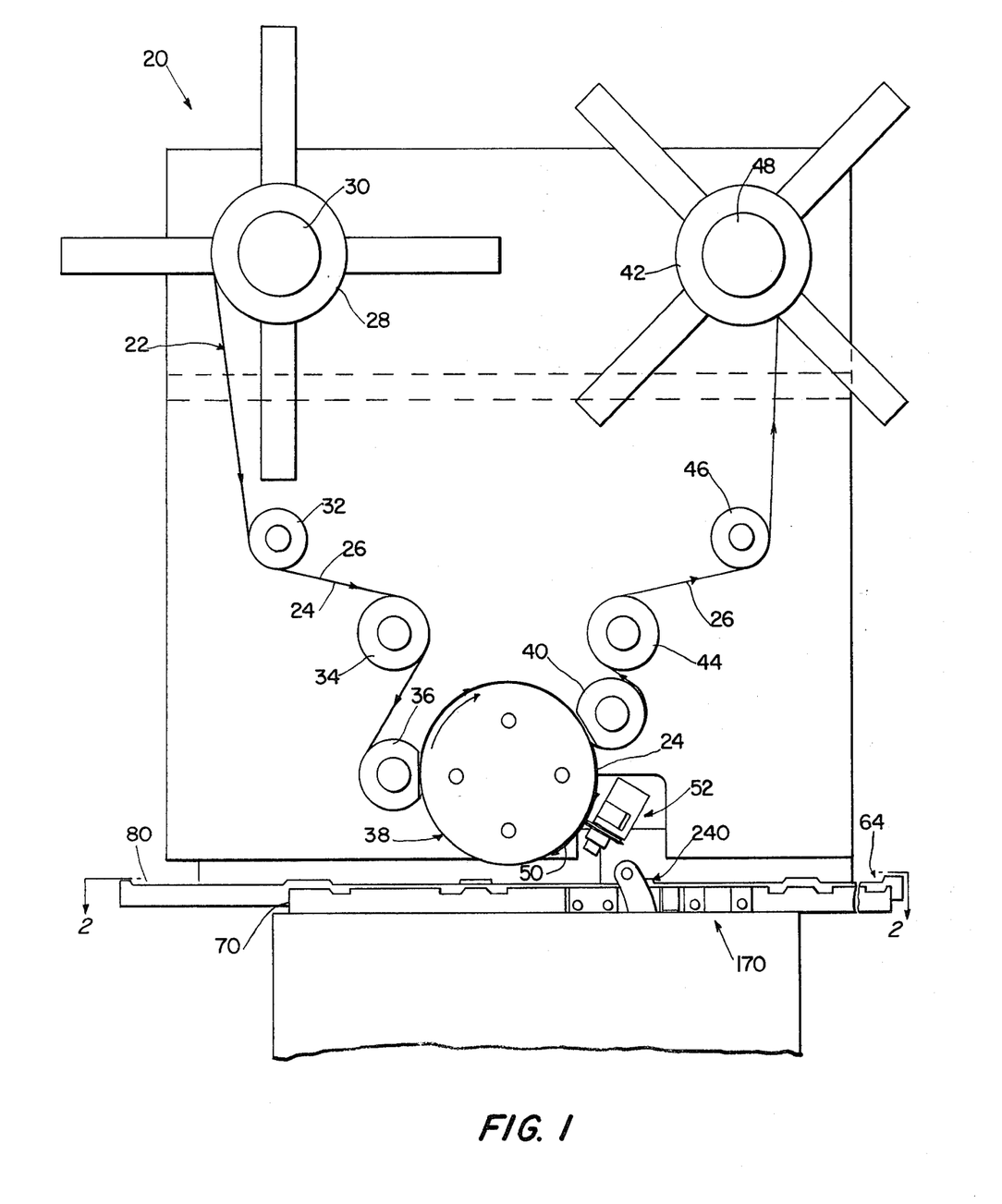
FIG. 1 is a scaled, front elevational view, with some parts removed, of an improved laminate applying machine according to the present invention.

With reference to the figures wherein like numerals represent like elements in the several views, an improved laminate applying machine in accordance with the presently preferred embodiment of the invention is denoted 20. With particular reference to FIG. 1, machine 20 uses a commercially available tape 22 that comprises a pressure adhesive laminate 24 mounted onto an easily removable backing web 26. Tape 22 is wound onto a supply reel 28 and a machine 20 supply reel 28 is mounted onto a feed spindle 30 that is being driven through a conventional magnetic clutch (not shown) by a continuous feed rotating motor (not shown) that drives the input shaft (also not shown) to the magnetic clutch. Tape 22 is fed around a plurality of guide rollers 32, 34, and 36 in a clock wise direction as depicted in FIG. 1 and tape 22 is fed around the top thereof to a separating roller 40. At separating roller 40, backing web 26 is fed around roller 40, whereas adhesive laminate 24 is fed around the periphery of tape drum 38. Backing web 26 is conveyed onto a take-up reel 42 through a plurality of guide rollers, such as guide rollers 44 and 46. Take-up reel 42 is mounted on a take-up spindle 48, which is also driven through a magnetic clutch (not shown) by the same continuously operating motor as discussed above with respect to feed spindle 30. Finally, adhesive laminate 24 is cut at a cutting station into a laminate segment 50 by a reciprocally driven cutter assembly 52.

It is noted that in FIG. 1, tape 22, laminate 24 and backing web 26 are shown loosely wound around, or separated from the various guide rollers and drum 38 so that its path can be seen. Obviously, when machine 20 is in operation, tape 22, laminate 24 and backing web 26 would be tightly wound around and guided by these components.

Tape drum 38 and cutter assembly 52, and the operations thereof, are depicted and described in detail in the written specification and the drawings of the parent application. The drawings and the written description are incorporated herein by reference.

Figure 2:
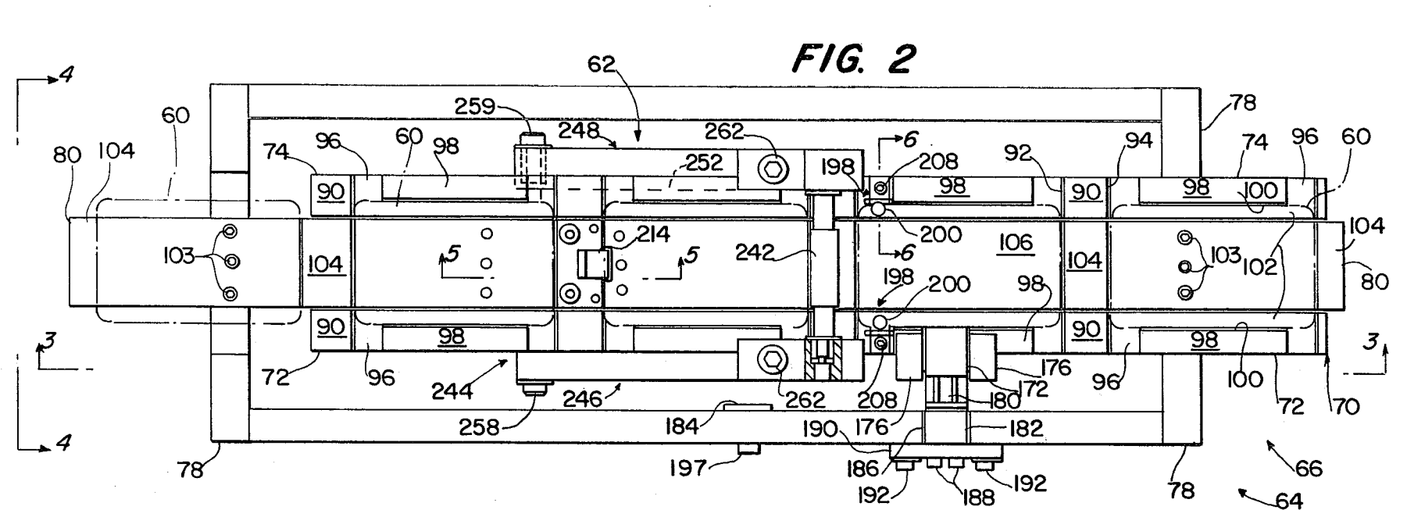
FIG. 2 is a scaled, top plan view of the walking beam assembly, with parts removed and parts cut away, taken along line 2—2 in FIG. 1.

As depicted in FIG. 2, an endless column of plates 60 is intermittently conveyed to and from an application station 62 by a walking beam conveyor 64. Plate 22 can be the same as those depicted and described in the parent specification. These plates are generally rectangular in plan view and have planar upper and lower faces.

Figures 6, 8, 9:
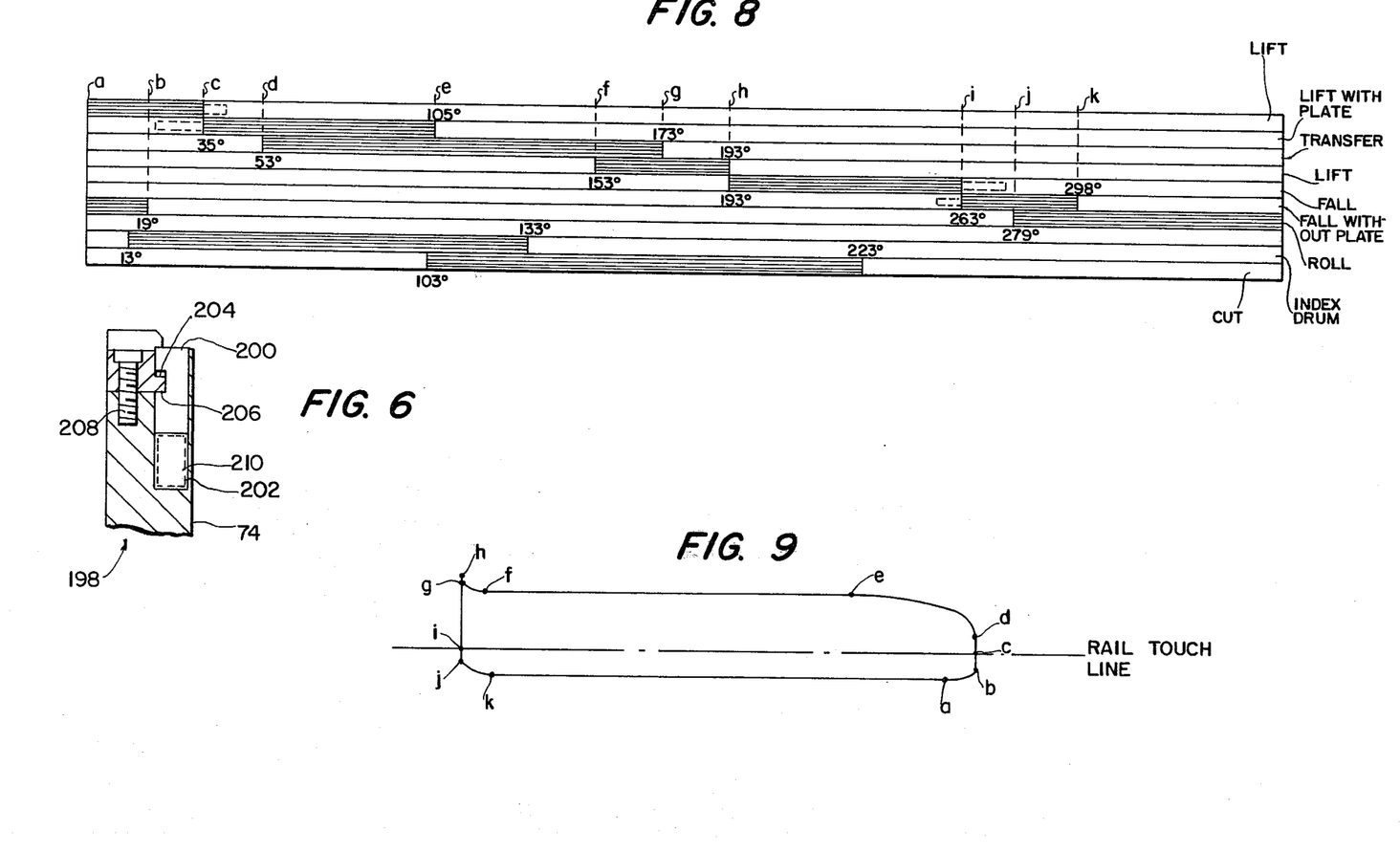
FIG. 6 is a scaled cross-sectional view of the plate motion permitting means taken along line 606 in FIG. 2.
FIG. 8 is a schematic bar graph timing chart of some of the elements of the present machine embodiment.
FIG. 9 is a schematic motion chart of the walking beam assembly.

In general, walking beam conveyor 64 comprises a walking beam assembly 66 and a walking beam moving means 68 (see FIG. 7) for generating movement in a generally parallelogram path when viewed in elevation, and which is depicted in FIG. 9 and described in greater detail hereinbelow.

Figure 7:
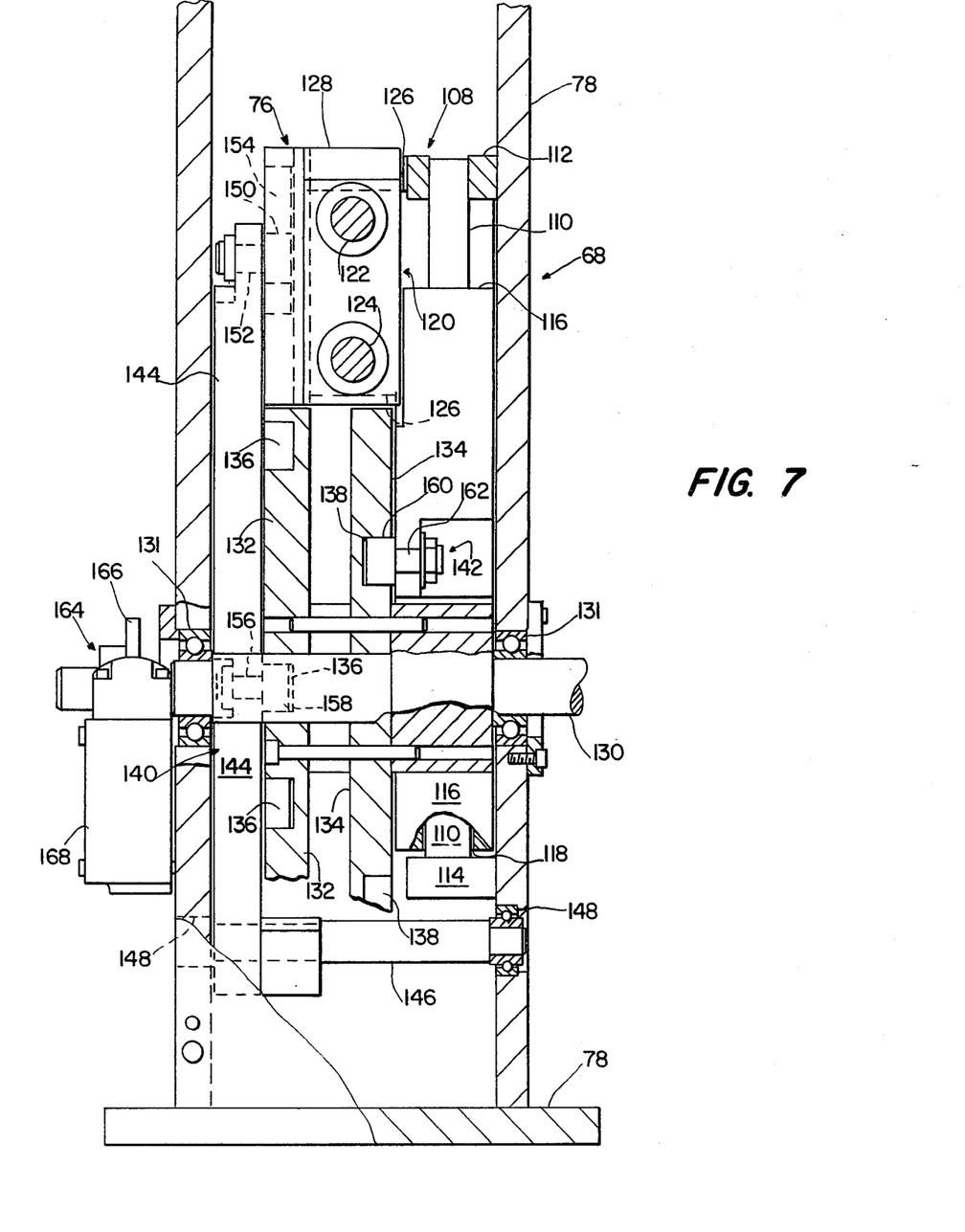
FIG. 7 is a scaled cross-sectional view of the walking beam assembly motion means, with some parts removed.

Walking beam assembly 66 includes a movable walking beam 70 that comprises two spaced apart beam members 72 and 74 and interconnecting beam frame 76 (see FIG. 7). Walking beam assembly 66 further includes a generally rectangular frame 78 and a single, elongate rail 80 centrally located between beam members 72 and 74 and rigidly attached at the ends thereof to frame 78.

Figure 3:
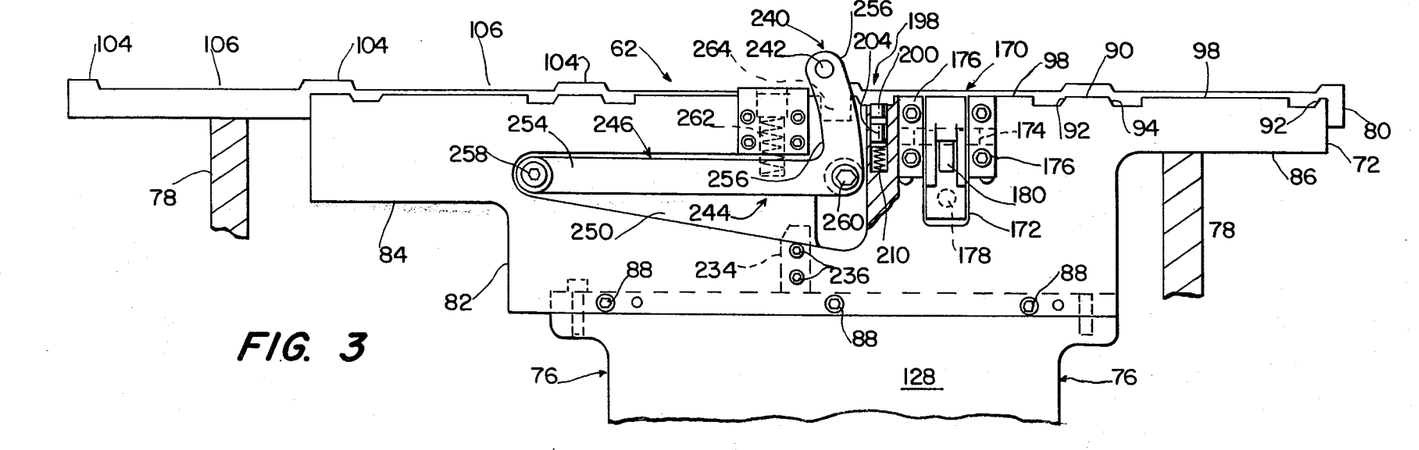
FIG. 3 is a scaled, front elevational view of the walking beam assembly, with parts removed and parts cut away, taken along line 3—3 in FIG. 2.

As best seen in FIGS. 2 and 3, walking beam members 72 and 74 are substantially the same and therefore only beam member 72 will be described. Beam member 72 consist of a three quarter inch steel plate having a generally "T" shape with a central portion 82, a taller forward or leading end 84 and a smaller rearward or trailing end 86. The bottom of central portion 82 is rigidly attached to the outside of beam frame 76 with a plurality of bolts 88. The top of beam member 72 has a plurality of integral, upstanding, dove-tailed shaped lands 90, each land having a forward and rearward slanting wall 92 and 94, respectively. Lands 90 extend transversely across the entire thickness of beam members 32 and 34 and thus, adjacent lands define a plurality of recesses 96, the length of which are substantially equal the length of a plate 60. A plurality of elongate, upstanding members 98 are centrally located between pairs of corresponding lands 90. As seen in FIG. 2, the outward side of members 98 is co-planar with a side of beam member 72 while member 98 extends transversely only slightly more than six-tenths of thickness of beam member 72. The inwardly facing walls 100 of opposite members 98 are spaced apart a distance substantially equal to the width of a plate 60 and have a slight inward slant so that a plate 60 can be easily received and centrally positioned therebetween. A ledge 102 for supporting the edge of a plate 60 is thus provided between inward wall 100 of members 98 and the inward face of beam member 74. Thus, a properly positioned plate 60 is supported on opposing ledges 102 of beam members 72 and 74 and is properly positioned and located at the ends by adjacent lands 90 and at the sides by opposing upstanding members 98.

Stationary rail 80, as mentioned above, is rigidly attached to frame 78 at either end thereof with bolts 103 and extends therebeyond. Rail 80, as beam members 72 and 74, generally has a plurality of longitudinally spaced apart lands 104 that define a plurality of recesses 106 therebetween. Lands 104 have a dove-tail shape so as to provide outwardly sloped walls for recesses 106. The spacing between lands 104 and hence, the length of recess 106 is substantially equal to the length of a plate 60. A shown in FIG. 2, the particular embodiment of machine 20 depicted therein has five recesses 106 in rail 80 for accomodating five plates 60. The central recess 106 is also located at application station 62.

Walking beam frame 76 is depicted in FIG. 7. Frame 76 is comprised of a vertical mounting assembly 108 having two vertical shafts 110 (only one of which is shown), and upper and lower mounting blocks 112 and 114, respectively, which rigidly mount shafts 110 to frame 78. A vertical slide block 116 has two bores (only one of which is shown) for slidably engaging shafts 110. Beam frame 76 further comprises a horizontal mounting assembly 120, which in turn comprises two horizontal shafts 122 and 124 connected at their respective ends to end plates 126 (only one of which is shown). End plates 126, in turn, are rigidly attached to vertical slide block 116. A horizontal slide block 128 is slideably mounted on horizontal shafts 122 and 124. Thus, a vertical movement of vertical slide block 116 is translated into a vertical movement of horizontal shafts 122 and 124 and consequently a vertical movement of horizontal slide block 128. Beam members 72 and 74, in turn and as mentioned above, are rigidly mounted on either side of horizontal slide block 128 with bolts 88 (see FIG. 3).

Walking beam moving means 68, also depicted in FIG. 7, is comprised of a main shaft 130 rotatably mounted in two bearings 131 contained in frame 78 and two plate cams, a horizontal motion cam 132 and a vertical motion cam 134. Shaft 130 is rotated at a constant rate of up to at least 60 rpm, one laminated plate being produced for each rpm of shaft 130. Cams 132 and 134 have corresponding cam tracks 136 and 138, the shape of which determine the horizontal and vertical movement, respectively, of walking beam 70.

The circular motion of cams 132 and 134 is translated into horizontal motion and vertical motion of walking beam 70 by cam folowers 140 and 142, respectively. Horizontal cam follower 140 is comprised of a substantially vertical, follower bar 144 rigidly connected at its lower end to a shaft 146, which in turn is rotatably mounted at each end in bearings 148 located in frame 78. A sheel 150 is rotatably mounted to the other end of follower bar 144 with a stub axle 152. Wheel 150 slides in a vertical slot 154 in horizontal slide block 128. In this way, independent vertical movement of horizontal slide block 128 can be accomplished without resultant horizontal movement thereof. Mounted to a central portion of cam follower bar 144 is another stub axle 156. Axle 156, in turn, rotatably mounts a cam follower wheel 158 that rides in cam track 136. As the height of cam track 136 changes, follower bar 144 and shaft 146 are pivoted in bearings 148 while the upper end of follower bar 144 oscillates and causes horizontal motion of slide block 128 along horizontal shafts 122 and 124.

Vertical cam follower 142 is much simpler and only comprises a cam follower wheel 160 which engages cam track 138 and which is mounted on a stub wheel 162. Axle 162 is rigidly mounted to vertical slide block 116. Thus, as the height of vertical cam track 138 changes with respect to the center of rotation of cam 134, vertical slide block 116 is vertically moved on stationary shafts 110. This motion is translated through end plates 126, to horizontal slide block 128, and finally to walking beam 70.

Mounted onto the end of main shaft 130 is a further cam assembly 164. Cam assembly comprises a cam wheel 166 and a cam follower (not shown) mounted within a housing 168. Cam assembly 164 can be used for counting shaft revolutions or for other timing purposes.

Figure 4:
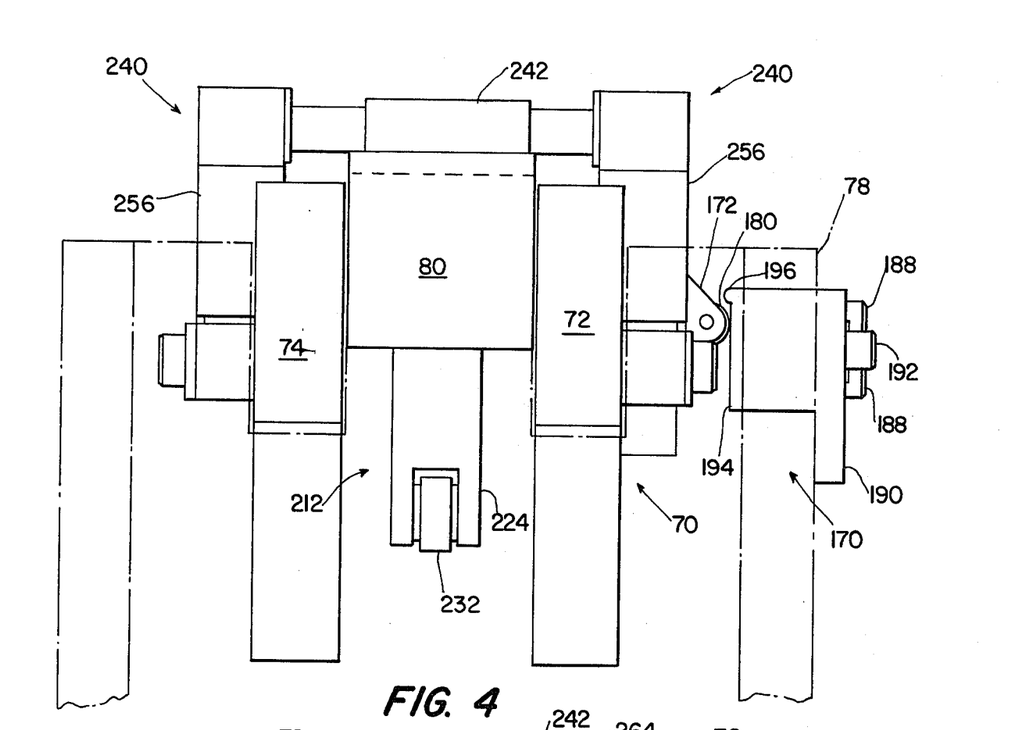
FIG. 4 is a scaled, end elevational view of the walking beam assembly, with parts removed, taken along line 4—4 in FIG. 2.

Two clamping assemblies are provided for removably, securely mounting a plate to walking beam 70 and for removably, securely mounting a plate to rail 80. The first clamping assembly is denoted 170 is FIGS. 3 and 4. Clamping assembly 170 comprises a lever 172 centrally pivoted on pin 174 that, in turn, is rotatably mounted on beam member 72 with mounting blocks 176. A spring (not shown), is mounted in a spring housing 178 in lever 172 between the side of beam member 72 and the lower end of lever 172. Thus the top of lever 172 is resiliently forced inwardly into engagement with a plate mounted on walking beam 70 (see also FIG. 2). Beam clamping assembly 170 also comprises a cam follower wheel 180 centrally mounted at the lower end of lever 172 and two, longitudinally spaced apart cam plates 182 and 184 (see FIG. 2). Cam plate 182 extends through an opening 186 in frame 78 and is adjustably mounted with bolts 188 to a mounting plate 190 through elongated slots. Mounting plate 190, in turn, is rigidly mounted to the outside of frame 78 with bolts 192. As seen in FIG. 4, cam plate 182 is comprised of a vertical, generally planar lower portion 194 and an upper rounded portion 196 that projects toward walking beam 70.

As mentioned above, mounted forward of cam plate 182 at operating station 62 is cam plate 184 (see FIG. 2). Because the vertical positioning of cam plate 184 is not as critical, it is rigidly, fixedly mounted to the inner surface of frame 78 with bolts 197.

When walking beam 72 is positioned in the starting position (as shown in FIGS. 2, 3 and 4), it is located below rail 80 and out of engagement with any plates 60 thereon. In this position, cam follower wheel 180 is below cam upper portion 196. The upper end of lever 172 extends inwardly, but does not engage a plate 60 because walking beam 70 is below the plates. However, as walking beam 72 is raised, cam follower wheel 180 engages cam plate upper portion 196, pivots the upper end of lever 172 outwardly against spring pressure so as to allow a plate 60 to be properly positioned longitudinally between opposing lands 90. After a plate 60 has been received on ledges 102 of beam members 72 and 74, cam follower wheel 180 clears cam plate 182 as walking beam 70 is lifted further, whereupon the spring forces the upper end of lever 172 into engagement with plate 60. In this manner plate 60 is removably, rigidly held between lever 172 and the opposing vertical member 98 of beam member 74.

After walking beam 70 has been positioned to its forwardmost position and as it is being lowered, cam follower wheel 180 strikes cam plate 184, pivoting lever 172 against spring pressure out of engagement with the plate 60. Thus, a plate 60 can be deposited onto rail 80 as walking beam 70 continues to travel downwardly.

Working in cooperation with walking beam clamping assembly 170 is a further assembly 198 depicted in FIGS. 2, 3 and 6 for permitting a pitching motion of plate 60 when in engagement with a laminate on drum 38. Plate motion permitting assembly 198 is comprised of two spaced apart, cylindrical rods 200 mounted inside corresponding, longitudinally aligned bores 202 in beam members 72 and 74, respectively. Rods 200 have a vertical notch 204 in one side for engaging an outwardly projecting boss 206 rigidly mounted with a bolt 208 on the corresponding beam member. A spring 210, located in bore 202 beneath rod 200, resiliently mounts rod 200. Notch 204 constraints the upward and downward travel of rod 200.

Thus, rods 200 supporting the forward end of a plate 60 positioned on the tops thereof permit the plate to undergo a slight pitching motion when the forward end of the plate contacts the end of a laminate segment 50 positioned at the bottom of drum 38. This pitching motion mermits a greater band of contact between plate 60 and the end of the positioned laminate segment 50.

Figure 5:
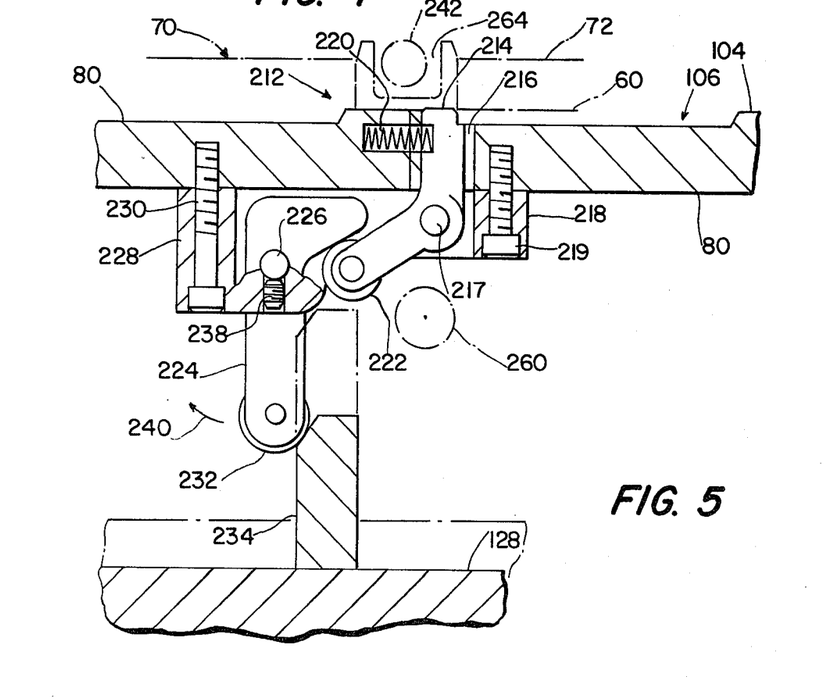
FIG. 5 is a scaled cross-sectional view of the rail plate clamping assembly, with parts removed, taken along line 5—5 in FIG. 2.

The rail plate clamping assembly, denoted 212, is depicted in FIGS. 2, 4 and 5. Rail clamping assembly 212 comprises an angular lever 214 that extends through a slot 216 centrally located in a mid portion of rail 80. Lever 214 is centrally mounted at its angular portion on a pivot pin 217 of a bracket 218. Bracket 218, in turn, is mounted to the underside of rail 80 with bolts 219. A spring 220 engages the upper end of lever 214 and forces it rearwardly into engagement with a plate 60 positioned on rail 80. A wheel 222 is rotatably mounted to the lower end of lever 214 and engages the upper end of a cam follower 224. Cam follower 224 has an inverted "L" shape and is pivotably mounted at a central portion thereof to the bottom of rail 80 with a pivot pin 226. Pivot pin 226, in turn, is mounted on a bracket 228 secured to the bottom of rail 80 with a bolt 230. A cam follower wheel 232 is rotatably mounted to the lower end of cam follower 224 and is for engagement with an upstanding cam plate 234 rigidly mounted to the side of beam member 72 with bolts 236 (see FIG. 3). Because clamping assembly 212 is struck by cam plate 234, its pivot pin 226 is resiliently mounted on a spring 238 so that sufficient play and resiliency can be provided.

Walking beam 70 normally contacts cam follower 224 of clamping assembly 212 at the upper most position of walking beam 70, shown in phantom in FIG. 5. This contact swings cam follower 224 in a clockwise direction as shown by arrow 240 in FIG. 5. The top of cam follower 224 strikes wheel 222 of lever 214 and rotates lever 214 in a counter-clockwise direction against the spring pressure exerted by spring 220. Thus, lever 214 is rotated out of the way to permit a plate being carried by walking beam 70 to be deposited in a corresponding recess 106 of rail 80.

A wiper means comprised of a roller assembly 240 for rolling a laminated segment 50 onto a plate 60 is primarily depicted in FIG. 3, although reference can also be had to FIGS. 2 and 4. Roller assembly 240 comprises a roller 242 rotatably mounted in a frame 244 which is pivotably mounted to walking beam 70. Frame 244 is comprised of two "L" shaped members 246 and 248 located in corresponding "T" shaped recesses 250 and 252 in beam members 72 and 74, respectively. Frame members 246 and 248 each has a generally horizontal, longer leg 254 pivotably mounted at its forward end and a generally vertical shorter leg 256, the upper end of which mounts roller 242. Pivotably mounting frame members 246 and 248 to beam members 72 and 74, respectively, are two stub axles 258 and 259, respectively. A support shaft 260, extends transversely below rail 80 and connects the angular portions of frame members 246 and 248 and provides further rigidity for frame 244.

Roller assembly 240 also includes two springs 262 that engage the tops of corresponding portions of horizontal legs 254 of frame members 246 and 248. Thus, springs 262 urge frame members 246 and 248 downwardly into recesses 250 and 252, respectively. Beam members 72 and 74 have notches 264 in their upper edge for receiving roller 242. In this way, roller 242 is maintained out of the way when not being used, and is urged downwardly into engagement with a plate 60 when being used for rolling the laminate segment 50 thereon. This is shown in phantom in FIG. 5.

Operation of laminate applying machine 20 can best be understood with reference to the timing chart depicted in FIG. 8, the motion chart depicted in FIG. 9, and the schematic drawings in FIGS. 10A through 10F depicting the interrelationships between the various components during the operation of laminate applying machine 20. The particular angles noted in the FIG. 8 timing chart refer to the rotation of the main shaft 130 shown in FIG. 7. The lower case letters in FIG. 8 correspond to the lower case letters in the motion chart of FIG. 9. With reference to FIGS. 8 and 9 and the description of the operation of walking beam conveyer 64, the particular shape of horizontal and vertical cam tracks 136 and 138 can be readily ascertained.

Figure 10A:
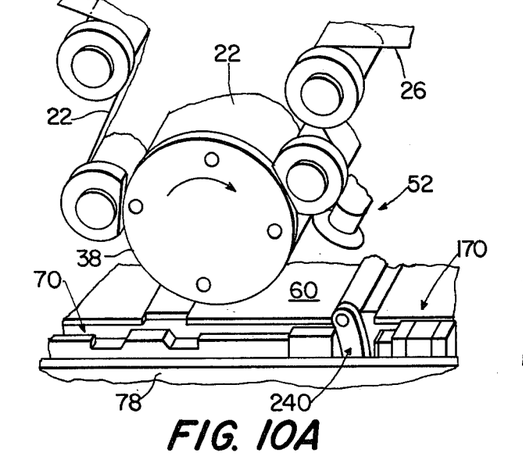
FIGS. 10A through 10F are schematic drawings, similar to FIG. 1, depicting the interrelationships between the various components during the operation of the present machine embodiment.

FIG. 10A depicts laminate applying machine 20 approximately in the position depicted by points "a" in FIGS. 8 and 9. Walking beam 70 is positioned to its substantially rearward most and to its lower most position, which is below and out of contact with the plates 60. The plates 60 are supported by rail 80 and roller assembly 240 has completed rolling and applying laminate segment 50 onto the plate 60.

As main shaft 130 begins to turn from the zero degree or reference position, walking beam 70 is moved rearwardly and upwardly. When main shaft 130 has rotated thirteen degrees, drum 38 begins to rotate and continues to rotate for the next 130° rotation of main shaft 130. At 19° of main shaft rotation, point "b", the rearward motion of walking beam 70 terminates while the vertical motion thereof continues. At point "c" on the motion chart, FIG. 9, the top of beam members 72 and 74 is at the same height as the top of rail 80. This occurs at the 35 degree position of main shaft 130. Also at this position of walking beam 70, the top of lever 172 of beam clamping assembly 170 is being rotated outwardly so as to permit a plate 60 resting on rail 80 to be picked up and received by walking beam 72 and 74. Similarly, rail clamping assembly 212 has released the laminated plate 60 located at application station 62 so that this plate can also be picked up by walking beam 70 and transported forwardly to the next station.

Figure 10B:
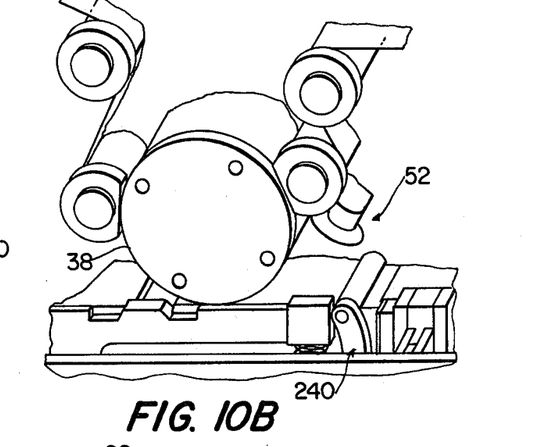

Walking beam 70 continues to be moved vertically until point "b" is reached, which occurs at approximately 53° of rotation of main shaft 130. FIG. 10B depicts the position of machine 20 at approximately this point in the cycle. The rotation of drum 38 is evident from the position of the attaching bolts, and roller 242 is shown positioned in notches 264 in walking beam member 72 and 74, where it will be out of the way, by springs 262. With cam follower wheel 180 out of engagement with cam plate 182, the upper end of lever 172 is forced into engagement with plate 60 holding the plate firmly against the opposite upstanding member 98 on beam member 74.

As main shaft 130 continues to rotate from the 53° position, the lifting of walking beam 70 continues while at the same time the forward motion thereof begins. The lifting motion of walking beam 70 continues until main shaft 130 reaches the 105° position, position "e", where the first lifting movement ceases. Shortly before position "e" is reached, cutter assembly 52 is activated to move transversely to begin cutting the positioned laminate 24. However, the actual cutting does not begin until approximately the 133° position of main shaft 130 so that the indexing of drum 38 can be completed. As stated in the parent application, cutter assembly 52 cuts during both the inward and outward transverse movements thereof. Therefore, it requires two complete revolutions of main shaft 130 for a complete inward and outward movement of cutter assembly 52. As explained in the parent application, this reduction in the frequency of operation of cutter assembly 52 is accomplished through conventional gearing, the cutter assembly also being driven by main shaft 130.

Figure 10C:
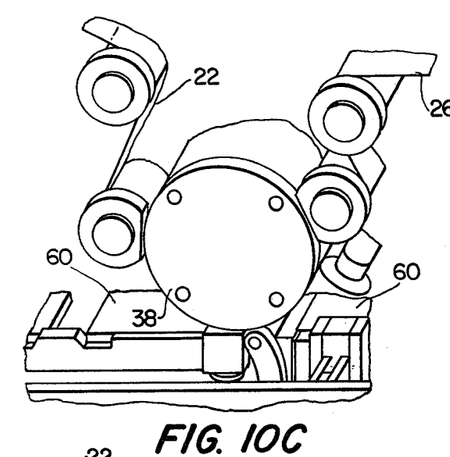
Figure 10D:
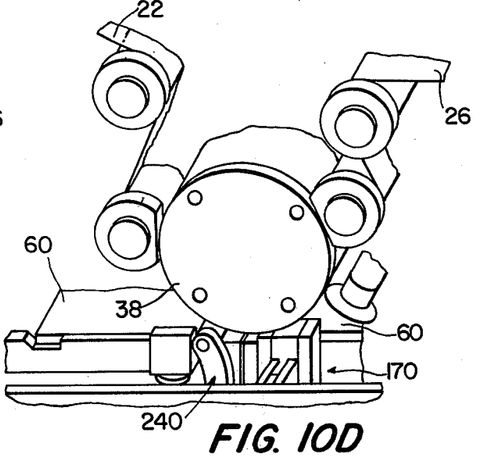

The forward motion of walking beam 70 continues to point "f", the 153° position of main shaft 130. FIG. 10C depicts laminate applying machine 20 at a position intermediate points "e" and "f".

The forward motion of walking beam 70 continues to point "g". However, a second upward motion of walking beam 70 also begins. At point g, depicted in FIG. 10D, the transported plate 60 is positioned to application station 62 with the forward end of plate 60 directly under the forward end of laminate segment 50. This is also the forward most position of walking beam 70. This is the position depicted in FIG. 5 where cam plate 234 engages cam follower wheel 232 to pivot the top of lever 214 out of the recess 106 in rail 80 located at the application station 62.

Only lifting motion of walking beam 70 occurs from points "g" to "h", a rotation of main shaft 130 from the 173° position to the 193° position. Cutter assembly 52 has almost completely cut the laminate segment 50 from the supplied laminate 24. In addition, the plate 60 contacting the end of laminate segment 50 is pitched slightly as a result of the compression of rod 200 in plate motion assembly 198. As mentioned above, this permits a wider band of contact between the end of laminate segment 50 and the forward end of plate 60.

From the position of main shaft 130 at 193° to the 239° position, there is only a downward vertical movement of walking beam 70. At the 263° position of main shaft 130, position "i", the top of the walking beam members 72 and 74 is at the same vertical height as the top of rail 80, and the transfer of plate 60 from walking beam 70 to rail 80 begins. Also at approximately this position, beam clamping assembly 170 engages the forward cam plate 184 to release the conveyed plate with the applied or attached forward end of laminate segment 50. By the time position "j" has been reached, rail clamping assembly 212 will have been activated to engage the top of lever 214 with the forward end of the deposited plate 60 as a result of the disengagement of cam plate 234 from cam follower wheel 232, as shown in FIG. 5.

Figure 10E:
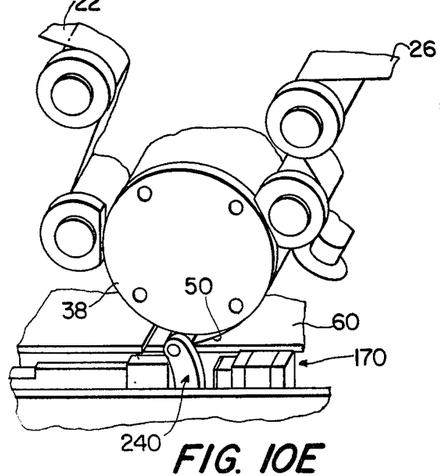
Figure 10F:
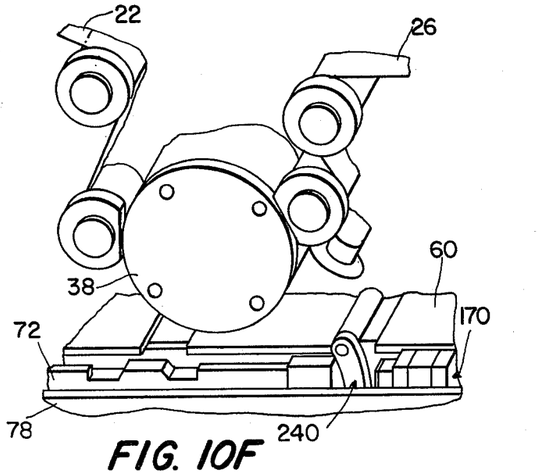

Continued rotation of main shaft 130 results in a further downward movement of walking beam 70 as well as rearward movement thereof until point "k" is reached. FIG. 10E depicts machine 20 approximately at this point. Roller 242 has been prevented from continuing downwardly with walking beam 70 on which it is mounted by the engagement thereof with the forward rail land 104 located at application station 62. Further rotation of main shafrt 130 results in the sequential contact of roller 242 which laminate segment 50 resulting in the sequential application of laminate segment 50 as it is removed from the bottom of drum 38. The rearward motion of walking beam 70 continues until the starting position at point "a" has been reached. FIG. 10F depicts laminate applying machine 20 at some location before point "a" has been reached. From point "a" the process is repeated. Thus, one laminate segment is cut and applied to one plate during each revolution of main shaft 130.

The operation and structure of a particular embodiment of the present invention has been described. This particular embodiment is faster, more efficient, and simpler than the device depicted in the parent application. With a laminate applying machine 20 according to the present invention, up to 60 plates per minute can be laminated. The increased efficiency and speed of the present invention is the result of using the returned stroke of walking beam 70 to perform the rolling function and to use the forward and second upward motion of walking beam 70 to perform the application of one end of the laminate to the forward end of the plate. A common power source can be used to operate all of the machine components, thereby providing a simpler and less expensive device. The present invention also has all of the advantages described with respect to the device disclosed in the parent application.

Although the invention has been described in detail with respect to an exemplary embodiment thereof, it will be understood by those of ordinary skill in the art that variations and modifications may be effected within the scope and spirit of the invention.

We claim:

1. A method for applying a laminate to a plate by using a walking beam assembly that includes a movable walking beam and a stationary rail, said walking beam having a forward movement, a downward movement, a rearward movement and an upward movement relative to said rail, said method comprising:
conveying said plate to an application position with said walking beam;
feeding an end of a laminate to said application position;
contacting and adhering one end of said plate to said laminate end;
moving said walking beam to cause relative contact between said adhering plate and laminate ends and a contact member and to cause relative longitudinal movement therebetween so as to apply successively said laminate to said plate; and
adhering said laminate onto said plate.

2. A method as claimed in claim 1 wherein at least one of said laminate and said plate have a pressure adhesive layer thereon and wherein said contacting step further comprises upwardly moving said plate with said walking beam to contact and adhere said one plate end to said laminate end.

3. A method as claimed in claim 2 and further comprising removably, securely mounting said picked-up plate to said walking beam before said plate and laminate contact.

4. A method as claimed in claim 3, wherein said laminate feeding step includes positioning said laminate in an operative conforming position on a rigid convex surface; and said method further includes resiliently mounting said one end of said plate on said walking beam so as to permit a slight pitching of said plate upon contact with said laminate end with a resultant larger area of contact therebetween.

5. A method as claimed in claim 2 and further comprising upwardly moving said walking beam during a first upward movement thereof to pick-up a plate located on said rail, forwardly moving said walking beam with said picked-up plate to said application position, and upwardly moving said forwardly moved walking beam during a second upward movement thereof to cause said contact between said laminate and plate.

6. A method as claimed in claim 5 and further comprising positioning and removeably, securely mounting said picked-up plate to said walking beam before said plate and laminate contact.

7. A method as claimed in claim 5 and further comprising placing said plate on said rail following said adhesion of said laminate and plate ends during a downward movement of said walking beam that immediately follows said second upward movement thereof.

8. A method as claimed in claim 7 wherein said contact member is mounted on said walking beam and wherein said contact member and laminate contact occurs after said placing of said plate on said rail and during said rearward walking beam movement.

9. A method as claimed in claim 8 and further comprising positioning and removably, rigidly securing said placed plate on said rail.

10. A method as claimed in claim 8 wherein said contact member includes a rotatably mounted roller such that upon said walking beam rearward movement, said roller rolls said laminate on said plate.

11. A machine for adhesively applying a laminate to a plate comprising:
a means for feeding and positioning the laminate;
a walking beam conveyor means for stepwise advancing a plate and for contacting and adhering an end of the plate with an end of the laminate during the advancement of the plate, said conveyor comprising a movable walking beam, means for moving said walking beam through at least a forward movement and a return movement, and a stationary rail; and
wiper means mounted so as to be in engagement with the adhered plate and laminate ends at a position of said movable walking beam for successively forcing said laminate onto said plate as said walking beam moves.

12. Apparatus as claimed in claim 11 wherein said wiper means includes a roller rotatably mounted such that said roller engages the laminate end and rolls the laminate on the plate.

13. Apparatus as claimed in claim 12 wherein said roller is rotatably mounted on said walking beam such that upon said conveyor return movement, said roller engages the laminate and rolls the laminate on the plate.

14. Apparatus as claimed in claim 13 wherein said wiper means further includes a pair of angular members having a generally horizontal leg and a generally vertical leg, means for pivotally mounting the distal ends of said horizontal legs to sides of said walking beam, spring means for urging said horizontal legs in a downward direction, and mounting means in the upper ends of said vertical legs for rotatably mounting said roller.

15. Apparatus as claimed in claim 13 wherein said walking beam is provided with a recess, and said wiper means further includes spring means for resiliently urging said roller into said recess when said roller is not being used.

16. Apparatus as claimed in claim 13 wherein said conveyor means includes means for removably, securely mounting a plate to said stationary rail of said conveyor means while said roller rolls the laminate on the plate.

17. Apparatus as claimed in claim 16 wherein walking beam comprises two, laterally spaced apart, beam members and a beam frame rigidly connecting said beam members together in longitudinal alignment; wherein said rail is rigidly mounted between said beam members; and wherein said plate mounting means comprises an elongate plate receiving recess defined by forward and rearward upstanding end members on said rail, said end members having opposing vertical sides for engagement with the ends of said plate, and comprises means for engaging one end of a plate for forcing the plate into a securing contact with the end member corresponding to the other end of the plate.

18. Apparatus as claimed in claim 17 wherein said conveyor plate engaging means comprises a pivotable lever vertically mounted in a central slot in said rail, spring means for urging the upper end of said lever longitudinally into engagement with a plate mounted in said rail recess, a cam follower means for moving the lower end of said lever, and a cam means engaged by said cam follower at one point during the travel of said walking beam for pivoting said lever out of engagement with a plate so that said walking beam can move a plate into and out of said rail recess.

19. Apparatus as claimed in claim 11 wherein said conveyor means further includes means for removably securely mounting a plate to said walking beam before the plate is placed into contact with the laminate.

20. Apparatus as claimed in claim 19 wherein said conveyor means further includes means for accurately positioning a plate on said walking beam.

21. Apparatus as claimed in claim 19 wherein said walking beam comprises two spaced apart beam members; and wherein said plate mounting means comprises an elongate, upstanding member extending along one side of a portion of the top of one of said beam members and having an inner vertical side for engagement with one side of a plate, and means mounted on the other beam member for engaging the other side of the plate for forcing the one side of the plate into a securing contact with said upstanding member.

22. Apparatus as claimed in claim 21 wherein said engagement means comprises a pivotable lever vertically mounted to a side of said one beam member, spring means for urging the upper end of said lever inwardly into engagement with a plate, a cam follower in contact with the lower end of said lever, and a stationary cam means engaged by said cam follower at one point during the travel of said walking beam for pivoting said lever out of engagement with a plate.

23. Apparatus as claimed in claim 21 wherein said conveyor means further includes means for accurately positioning a plate on said walking beam, said means comprising two longitudinally aligned, elongate recesses respectively in the top surfaces of said beam member, each said recess being defined by a forward and a rearward slanting wall, said recesses having a length substantially equal to the length of a plate.

24. Apparatus as claimed in claim 19 wherein said laminate feeding means includes a cylindrical, rotatable drum, and a means for supplying the laminate to the periphery of said drum whereby a laminate on the periphery thereof can assume the arcuate contour of the outer drum periphery; and wherein said walking beam moving means moves said walking beam in an upward movement and a downward movement, said drum being mounted above said conveyor means such that one end of the plate contacts one end of the laminate during an upward movement of said walking beam; and said apparatus further including means for permitting a slight pitching motion of a plate on said walking beam when the plate is contacting a laminate on said drum such that a band of contact is made between the plate and the laminate.

25. Apparatus as claimed in claim 24 wherein said plate motion permitting means comprises a support member having a top supporting surface, a spring means for resiliently urging said support member upwardly, and a mounting means for mounting said support member within said walking beam at one end of the portion thereof that receives a plate and for limiting upward movement of said support member, while permitting downward movement thereof such that said support member top supporting surface can supportingly engage one end of a plate yet permit said one end of the plate to be depressed upon the application of a sufficient force.

26. Apparatus as claimed in claim 11 wherein said laminate feeding means comprises means for positioning and holding one end of a laminate above said walking beam for contact with a plate on said walking beam;

said wiper means includes a roller rotatably mounted on said walking beam; and said conveyor means comprises two walking beam members mounted on either side of said rail, first plate mounting means for removably securely mounting the plate onto said walking beam during contact with said laminate holding means, second plate mounting means for removably, securely mounting the plate onto said rails, and means for moving said walking beam through a first upward movement whereby a plate positioned on said rails is picked-up by said walking beam, a forward movement whereby a forward end of a picked-up plate is positioned under said laminate end holding means, a second upward movement whereby the plate is forced into adhering contact with said laminate, a downward movement whereby the plate is deposited on said rails, and a rearward movement whereby said roller engages the laminate and plate and rolls the laminate on the plate.

* * * * *